Feb. 9, 1943.  H. W. LONGDIN  2,310,450
FILLERSTRACTOR
Filed May 5, 1939  2 Sheets-Sheet 1
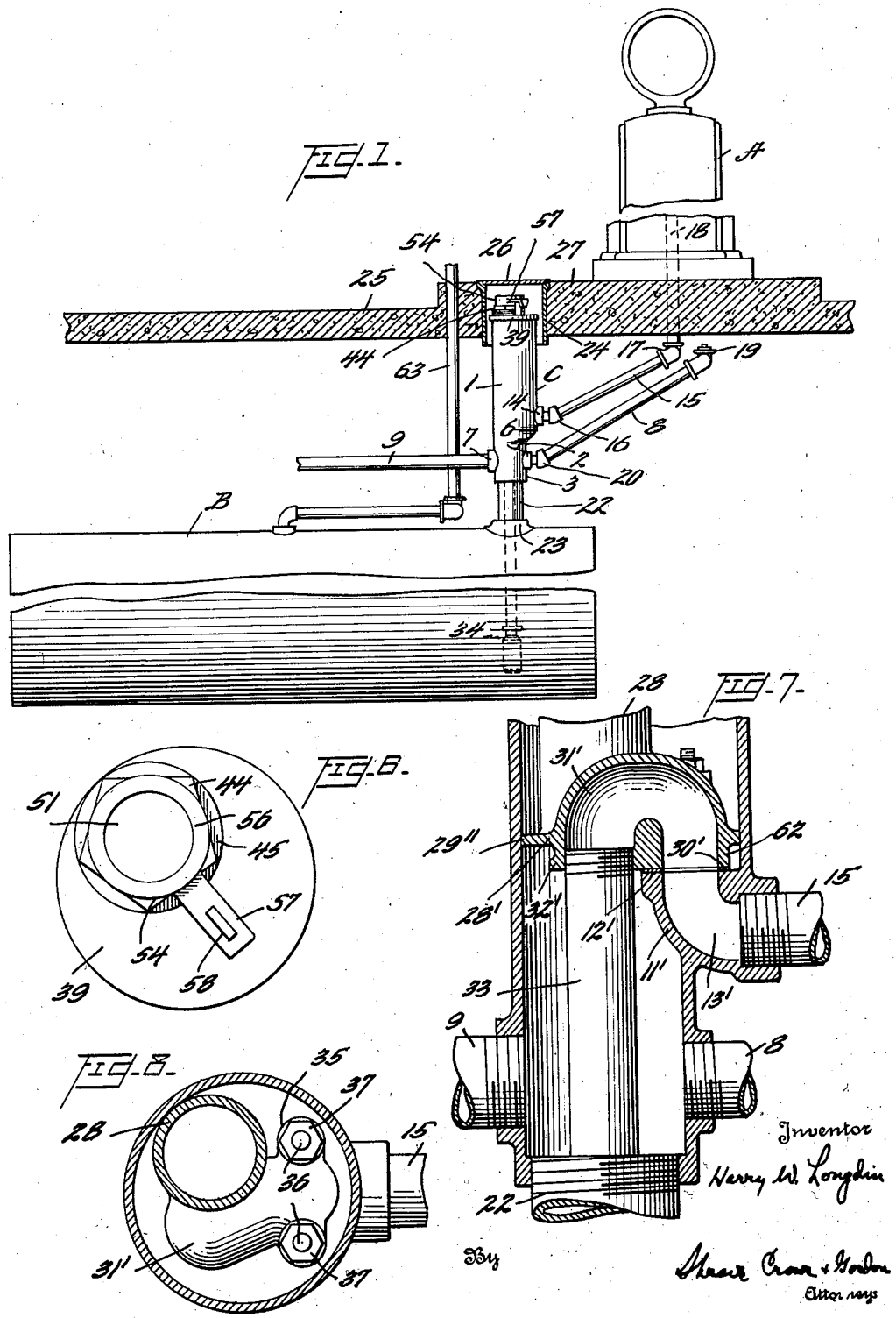

Feb. 9, 1943. H. W. LONGDIN 2,310,450
FILLERSTRACTOR
Filed May 5, 1939 2 Sheets-Sheet 2
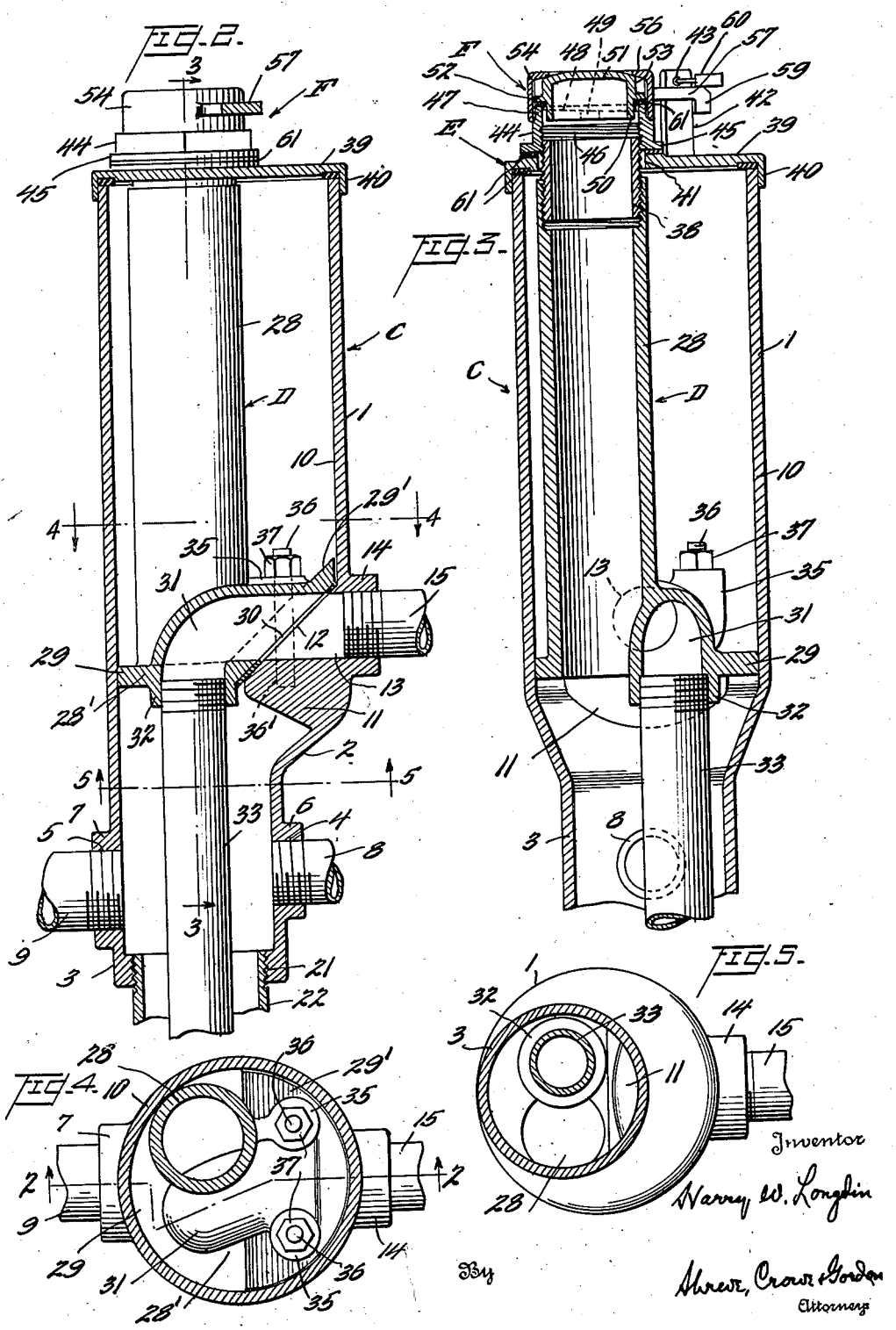

Patented Feb. 9, 1943

2,310,450

UNITED STATES PATENT OFFICE 2,310,450

FILLERSTRACTOR

Harry W. Longdin, Atlanta, Ga., assignor, by mesne assignments, of one-third to James V. Malcolm, Jr., Decatur, Ga., and one-third to Julian C. Stanley, Fulton County, Ga.

Application May 5, 1939, Serial No. 272,016

3 Claims. (Cl. 220—86)

Generically this invention relates to gasoline storage tank assemblies but it more specifically is directed to a fitting for such tanks of the subsurface type and constitutes a further development of the subject matter of Patent No. 2,074,267 granted March 16, 1937, for Fillerstractor.

An important object of this invention is the provision of a casting constituting a casing and a removable combined filler and suction pipe unit adapted for seating engagement within the casing.

One of the principal objects of this invention is the provision of a device of this character comprising a casting constituting a casing formed with an interior seat, a combined filler and suction pipe unit detachably seating within the casing, and means whereby the seating of the unit within the casing automatically establishes communication between the suction pipe and exterior of the casing.

Another improvement object of this invention is the provision of a device of this character comprising a casing having an exterior outlet opening and formed with an interior seat, a detachable filler pipe and suction pipe unit adapted to be removably positioned on said seat and whereby seating of said unit effects connection between the suction pipe and outlet opening, said casing being formed with a return inlet pipe opening and an auxiliary external filler pipe opening.

A further important object of this invention is the provision of a device including a casing, a combined filler pipe and suction pipe unit removably seating within the casing, a closure assembly for the casing and filler pipe consisting of a cover for the casing having a filler pipe opening and a cap assembly associated with said opening enclosing the upper end of the filler pipe, and means in connection with said cover for effecting locking of the cap assembly against unauthorized removal.

A further important object of this invention is the provision of a device of this character comprising a casting constituting a casing formed with an interior seat, a detachable filler pipe and suction pipe unit adapted to be positioned on said seat, the construction of the casting and unit being such as to provide a casting of minimum size and cost and permitting straight line removal and replacement of said unit, a head for the casting having a filler pipe opening, a cap assembly including means detachably connected to the upper end of the filler pipe adapted to secure the head to the casting, and a closure for the filler pipe removably connected to the filler pipe connecting means, and means associated with said head designed to prevent unauthorized removal of the assembly or filler pipe closure.

Another important object of this invention is the provision of a device of this character adapted to be sunk in the ground comprising a casting constituting a casing formed with an interior seat, a detachable filler pipe and suction pipe unit adapted to automatically effect connection between the suction pipe and the exterior of the casing when positioned on said seat, detachable means for attaching the unit to said seat, a head or cover for the casing having a filler pipe opening, a cap assembly including means detachably connected to the filler pipe for securing the head to the casing, the end section of said filler pipe being detachable, whereby replacement of said unit attaching means and end filler pipe section may be effected without necessitating digging up and removal of the device as has heretofore been necessary.

With these and other objects in view, which will become apparent as the description proceeds, the invention resides in the construction, combination and arrangement of parts, hereinafter more fully described and claimed and illustrated in the accompanying drawings, in which like characters of reference indicate like parts throughout the several figures, of which:

Fig. 1 is a side elevation of my improved device shown in connection with the pump and gasoline tank.

Fig. 2 is a vertical section on the line 2—2 of Fig. 4.

Fig. 3 is a section taken on the line 3—3 of Fig. 2.

Fig. 4 is a horizontal section on the line 4—4 of Fig. 2.

Fig. 5 is a horizontal section on the line 5—5 of Fig. 2.

Fig. 6 is a plan view.

Fig. 7 is a vertical longitudinal section of a modified form.

Fig. 8 is a horizontal section on the line 8—8 of Fig. 7.

As stated in my prior Patent No. 2,074,267 regarding pipe connections and fittings with respect to gasoline storage tank and pump assemblies having proven deficient in many respects rendering it necessary to provide a casing through which were adapted to extend all pipe connections including the filler pipe and a suction pipe having a union connection within the casing so that the suction pipe could be removed, and while this construction was a distinct advance in the art, yet changes in gasoline filling station equipment and layout have called for further development in this field.

It has been found that due to temperature changes, either the casing construction or the concrete surface are liable to become damaged and, therefore, it has proven desirable to position the upper end of the device below the surface of the ground or concrete and surround the same with an auxiliary manhole structure allowing expansion and contraction without damage to the casing or fitting.

Further, in order to decrease production costs, it has been found desirable to reduce the size and change the configuration of the casing and to change the filler pipe and suction pipe construction to adapt them to such reduced size, and to render them more easily removed and replaced. This I accomplished by providing a seat within the casing having communication with the exterior of said casing, and a combined removable filler pipe and suction pipe unit adapted to be positioned on said seat and capable of being lifted out of the casing in a straight line, similarly replaced, and as it is seated adapted to automatically establish suction pipe connection with the exterior of the casing, and means for detachably securing the unit on said seat.

Heretofore, whenever the threaded or other connections within a casing became damaged it was necessary to dig up the casing and in some cases replace entire pipe connections in order to effect such repairs, which entailed not only time but extra expense, and these disadvantages have been overcome by having all threaded connections and threaded attaching means detachable, so that the threaded parts can be removed and replaced without disturbing or necessitating the removal of the casing during its life. I have also eliminated bolt means for attaching the closure assembly to the casing and have provided a unique filler pipe cap assembly for threaded engagement with the filler pipe adapted to secure the closure or cover to the casing and embodying a detachable filler pipe cap and means for locking said cap and assembly against unauthorized removal. Owing to the size and shape of the threaded nut connecting the filler pipe and cap assembly and their being positioned within the auxiliary manhole renders them practically immune from being tampered with.

Another distinct advantage of the instant invention is that while there is a straight line opening through the filler pipe permitting the insertion of a measuring stick, or hose for removing the contents of the tank which frequently is necessary by reason of the accumulation of water or other substance in the tank, this can be more easily done by simply removing the filler pipe and suction pipe unit, which permits the insertion of brushes and the like for more effectively cleaning the tank, and which heretofore could not be easily accomplished.

In the illustrated embodiment characterizing this invention there is shown a pump structure A, storage tank B, and casing or fitting unit C, the pump and tank being of conventional construction is shown for illustrative purposes and forms no part of the present invention.

The device C comprises a cylindrical casting constituting a casing, reduced throughout a semi-circular portion of its circumference at a point spaced from its bottom as at 2 and forming the reduced cylindrical section 3 formed with a fluid return pipe opening 4 and an auxiliary filler pipe opening 5 opposite thereto, the casting surrounding said openings being formed with the lateral flanges or nipples 6 and 7, respectively, internally threaded to respectively receive the threaded ends of return pipe 8 and auxiliary filler pipe 9, as clearly shown in Fig. 2 of the drawings. The larger cylindrical portion 10 is formed with an interior projection or seat block structure 11 having an inclined face or seat 12, said portion 11 being formed with a lateral bore 13 effecting communication between seat 12 and the exterior of the casing, the latter being formed with flange or nipple 14 surrounding said opening and internally threaded to receive one end of the external suction pipe connection 15, in the present instance having a union joint 16 to permit angular movement of said pipe with respect to said casing as desired, said pipe 15 being connected at its upper end by a union or connection 17 to the pump suction pipe section 18, as will be clear without further discussion.

Some types of pumps do not require return pipes, while others do. In the present instance, the return gasoline pipe 8 is shown blocked off as at 19, but which may be connected to the return pipe section of a pump as desired. Said pipe 8 is also formed with union 20 effecting a movable joint similar to 16 above described. The lower end of section 3 of the casing is internally threaded as at 21 to receive the threaded end of pipe section 22, the lower end of which is adapted for threaded engagement or other suitable connection with flange plate 23 suitably formed on or connected to the tank for effecting communication therewith, as clearly shown in Fig. 1.

When device C is operatively positioned its upper end extends within the auxiliary manhole structure 24, which is of greater diameter than said device and which is sunk in the ground or concrete 25 with its detachable cover 26 flush with and forming a continuation, in the present instance, of the raised portion 27 constituting the pump island or supporting base.

A filler pipe and suction pipe unit D designed to be positioned in casing 1 comprises a filler pipe 28 which may be suitably connected to, but preferably is cast integral with, a foot or base portion 28' of a shape and diameter corresponding to the interior dimension of section 10 of the casing and including a semi-circular lateral flange portion 29 and an opposite semi-circular flange portion 29' extending upwardly therefrom at an incline and forming the complemental seat 30 correspondingly inclined to seat 12 which is adapted to engage when the unit is operatively positioned, said foot portion 28' being formed adjacent the lower edge of said filler pipe, in offset relation, with a right angularly extending bore or conduit 31 adapted, when the unit is seated on seat 12, to form with bore 13 a continuation of the external suction pipe connection 15, the other end of said bore extending downwardly and through the depending flange 32 formed on the under surface of flange 29. Flange 32 is internally threaded to receive the upper threaded end of suction pipe 33 adapted to extend within the tank adjacent the bottom thereof and to have suitably mounted on its lower end a foot valve and strainer 34. The above construction forms a continuous suction pipe line from the foot valve and strainer 34 to the pump A as will be apparent.

The upper surface of flange 29' is formed on opposite sides of bore or conduit 31 with lugs 35 suitably bored to receive bolts 36, threadedly anchored in the seat block or projection 11 as at 36', when the unit D is operatively positioned on seat 12 and secured thereon by nuts 37. Should the threads on the upper ends of bolts 36 become damaged said bolts can be threadedly removed from seat block 11 and be replaced without having to disturb the casing C.

The upper end of filler pipe 28 terminates slightly below the upper end of casing 1 and is internally threaded to receive the lower end of threaded section 38 which is adapted to extend above said casing and form a continuation of said filler pipe 28. The section 38 has threads on its upper end running opposite to those on its lower end, and should they become damaged, said section can be replaced without having to replace the entire filler pipe as has heretofore been prevalent.

A closure assembly E for the casting or casing 1 comprises a head or cover 39 formed with a depending flange 40, a filler pipe opening 41, and an integral post 42 formed in its upper end with an opening 43, said head or cover being adapted to fit over the upper end of casing 1 with the upper end of filler pipe section 38 extending through filler pipe opening 41.

Closure assembly E includes a filler cap assembly F comprising a pentagonal internally threaded ring nut member 44 formed on its bottom surface with an annular flange 45 adapted to seat on head or cover plate 39 when threadedly engaged on the threaded end 46 of filler pipe section 38, which threads extend oppositely to those on the lower end of said section, and which secures the cover 39 on the casing. Said ring 44 is formed with an upwardly projecting annular flange 47 formed at its upper edge with an inwardly projecting flange 48 slotted at opposite points to receive the lateral lugs 49 formed on the depending annular flange portion 50 of the detachable filler cap 51, and adapted to engage under flange 48, when said cap is rotated to locking position, said cap having a lateral flange portion 52 adapted to seat on the upper edge of flange 47. Cap 51 is adapted to be scalloped or knurled as at 53 to effect easy manipulation and handling thereof. A cap ring 54 embracing cap 51 is adapted to seat at its lower edge on nut portion 44 and bridge the jointure of flange 47 and portion 52 of cap 51 and is formed with a lateral flange 56 engaging the upper surface of cap 51, said cap ring being formed with an arm 57 slotted as at 58 to receive the upper end of post 42 and is formed at its outer end with a downwardly projecting lug 59 adapted to engage post 42 and prevent tilting of said ring 54 when operatively positioned, said cap being locked in capping position by lock 60 engaged in opening 43, as will be well understood.

It will be noted that all removable contacting parts have interposed gaskets 61.

Fig. 7 illustrates a slightly modified form of the interior casing seat and filler and suction pipe unit cooperating seat structure. This form is similar to that above described except that a flat instead of an inclined seat structure is provided, therefore the inwardly extending projection or seat block 11', instead of the inclined seat 12, is formed with a flat seat 12', and the foot structure 28' is formed with the flange 29' in the same lateral plane throughout, and with a U-shaped conduit 31', corresponding to conduit 31, extending from flange 32' upwardly and downwardly and terminating at the lower end of flange 62 formed on the under surface of flange 29' and constituting a seat or seat engaging surface 30'. Said inwardly extending projection or seat block 11' is formed with an upwardly projecting right angular bore 13' which with conduit 31' forms a conduit connection between the exterior of the casing or exterior suction pipe 15 and suction pipe 33 thereby effecting a continuous suction pipe line from the strainer 34 to pump A similar to that described in connection with Fig. 3.

While I have shown (Fig. 1) the tank B as sunk in the ground close to the pump A with the casing unit accessible through the pump island or base it is to be understood, that where it is desired to mount the tank a further distance from the pump it is only necessary to length the suction pipe section 15 and the return pipe 8. It is sometimes desired to fill the tank without interfering with the approach of automobiles and consequent operation of the pump and, therefore, I have provided an auxiliary filler pipe 9 to which access may be had at a point remote from the casing unit and pump assembly. In this connection the tank B is shown with the usual vent pipe 63.

While the operation would seem to be clear from the above description it might be well to further state that to fill the tank all that is necessary is to remove lock 60, lift off cap ring 54, rotate cap 51 sufficiently to disengage lugs 49, and fill the tank through filler pipe 28. To determine the contents of the tank all that is necessary is to insert a measuring stick through filler pipe and then return the above parts to their initial positions.

When it becomes necessary in order to effect repairs with respect to the filler tube or suction pipe section 33, to clean strainer 34, to remove the contents of the tank, and, to insert a brush or other means to aid in cleaning said tank, it is only necessary to remove the cap ring 54 and unscrew the nut 44 from the upper end of section 38, lift off head or cover 39, and unscrew nuts 37, whereupon the filler pipe and suction pipe unit D may be lifted in a straight line out of the casing. In view of the fact that the upper end of the casing is below the upper edge of the manhole structure and the nuts 37 are within the casing, and in order to expedite their removal and avoid the inconvenience of separate tools I have designed a substantially L-shaped wrench, one end having a socket corresponding to the configuration of the pentagonal ring nut 44 and the other corresponding in shape to nuts 37, so as to expeditiously effect the removal and replacement of these nuts as desired. To replace the unit D all that is necessary is to drop it in place on bolts 36 and restore the parts to their initial positions.

From the above it will be apparent that I have designed a device or casing of a minimum size, a filler pipe and suction pipe detachable unit of simplified construction designed to fit in the casing and to be easily removed and replaced, a closure unit for the casing and a filler cap assembly associated therewith, simplified means for securing the cover to the casing and also the filler cap against unauthorized removal, the interior construction of the casing and unit being such that seating of the unit automatically effects communication between the suction pipe and the exterior of the casing, the connecting means of the unit and closure structure with the filler pipe being replaceable without requiring replacement of the major features of the device, the entire device being easily installable, manufacturable at a minimum cost and efficient for the purposes intended.

Although in practice I have found that the form of my invention illustrated in the accompanying drawings and referred to in the above description as the preferred embodiment, is the most efficient and practical, yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A suction line assembly for storage tanks including a casing open at its ends, one end adapted for connection with a storage tank, and provided intermediate its length with an outlet opening and a seat surrounding said opening, a filler and suction pipe combined in offset relation in a unitary structure removably seated within the casing, said unitary structure provided with means integral with said structure for establishing uninterrupted communication with said outlet opening and means on said first mentioned seat for centering and maintaining said unit in seating position.

2. A suction line assembly for storage tanks including a casing open at its ends, one end adapted for connection with a storage tank, and provided intermediate its length with an outlet opening and a seat surrounding said opening, a filler and suction pipe combined in offset relation in a unitary structure removably seated within the casing and provided with means for establishing uninterrupted communication with said outlet opening, and means on said seat for centering and maintaining said unit in seating position, said means including anchor bolt means anchored in said seat.

3. A suction line assembly for storage tanks including a casing open at its ends, one end adapted for connection with a storage tank, and provided intermediate its length with an outlet opening and a seat surrounding said opening, a filler and suction pipe combined in offset relation in a unitary structure removably seated within the casing, said unitary structure being provided with complemental seat means for establishing uninterrupted communication with said outlet opening upon the seating of said structure, and means on said first mentioned seat for centering and maintaining said unit in seating position, said means including removable bolt means anchored in said seat.

HARRY W. LONGDIN.